Sept. 9, 1958  G. WHITE  2,850,844
METHOD AND APPARATUS FOR HEATING
AND BENDING GLASS SHEETS
Filed Dec. 27, 1955
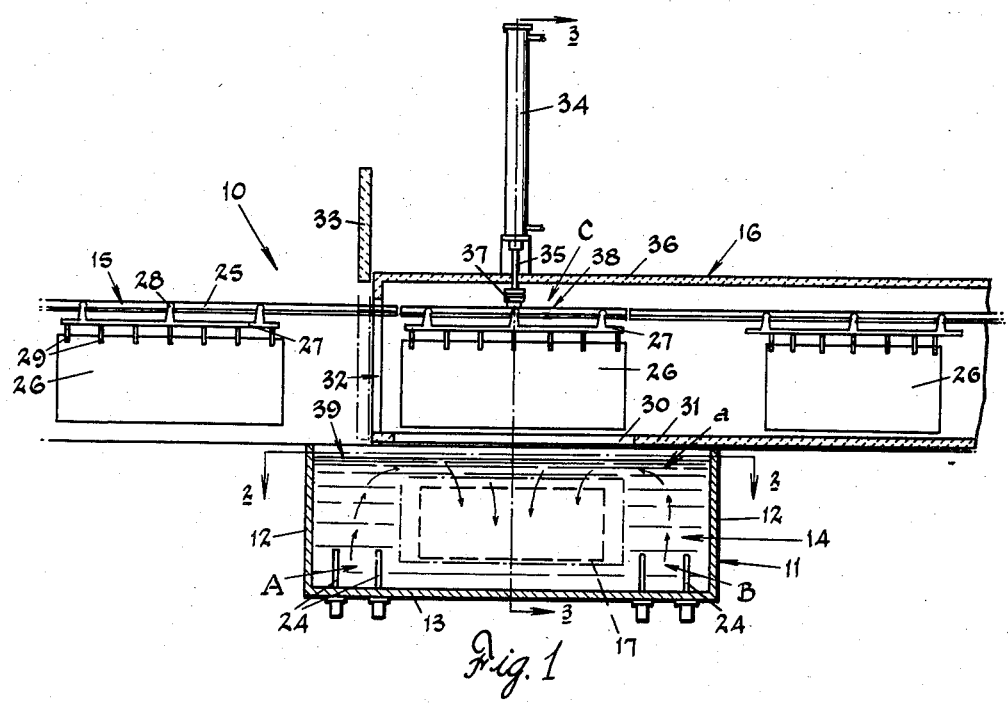
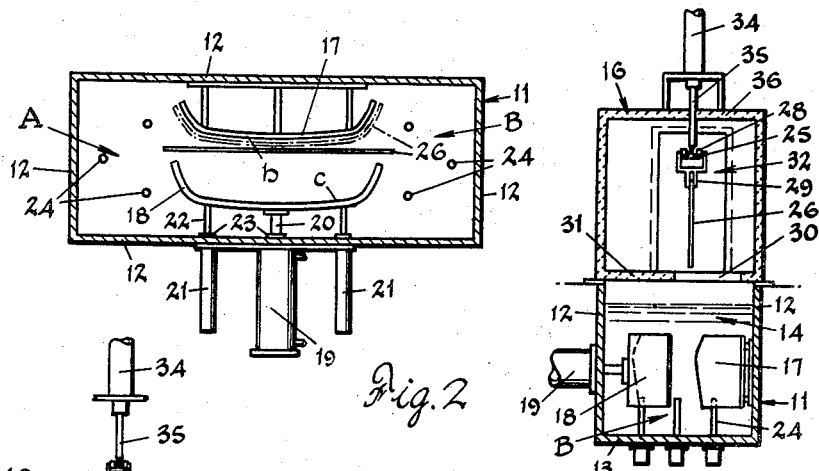
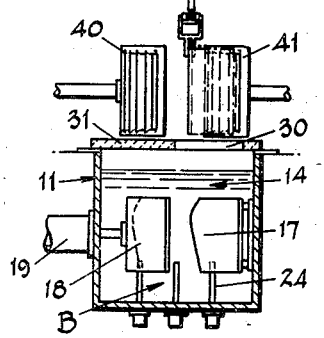
INVENTOR.
Gerald White
BY
Nobbe & Swope
ATTORNEYS

United States Patent Office 2,850,844
Patented Sept. 9, 1958

2,850,844

METHOD AND APPARATUS FOR HEATING AND BENDING GLASS SHEETS

Gerald White, Rossford, Ohio, assignor to Libby-Owens-Ford Glass Company, Toledo, Ohio, a corporation of Ohio Application December 27, 1955, Serial No. 555,614

13 Claims. (Cl. 49—7)

The present invention relates generally to the heating of glass sheets, and more particularly to an improved method and apparatus for heating glass sheets to elevated temperatures.

In the past, one of the principal drawbacks to increasing the volume of production in the heating of glass sheets, prior to bending or tempering the sheets, has been the length of time required to heat the sheets to the elevated temperatures required for bending or tempering. The presently used methods involve a bending furnace in which the glass sheet is passed through progressive zones of increased temperature until the sheet reaches bending temperature or the temperature desired to properly enable the sheet to conform to the molds generally used.

Since the heating of the sheets takes a certain amount of time, the production rate of any given heating and bending, or tempering, line is necessarily determined by the amount of time it takes to heat the sheets to the required temperature.

It is therefore the primary object of the present invention to provide an improved method and apparatus for heating glass sheets to elevated temperatures.

Another object of the invention is to provide an improved method and apparatus for heating glass sheets to elevated temperatures wherein the sheets are heated in a hot liquid bath.

Another object of the invention is to provide an improved method of bending glass sheets wherein the surfaces of the sheets to be bent are coated with a liquid cushioning material and then engaged by curved forming members.

A further object of the invention is to provide an improved method of heating and bending glass sheets wherein the sheet to be bent is heated to the softening point in a liquid bath and then bent to desired curvature while maintained in said bath.

A still further object of the invention is to provide a method and apparatus for bending ground and polished glass sheets on a solid forming or shaping surface.

Other objects and advantages of the invention will become more apparent during the course of the following description when taken in connection with the accompanying drawings.

In the drawings, wherein like numerals are employed to designate like parts throughout the same:

Fig. 1 is a fragmentary longitudinal sectional view of one form of heating and bending line adapted to perform the method of the invention;

Fig. 2 is a horizontal section taken substantially along the line 2—2 of Fig. 1;

Fig. 3 is a vertical section taken substantially along the line 3—3 of Fig. 1; and Fig. 4 is a vertical section of a modified form of heating and bending line.

Briefly stated, the present invention provides a novel method and apparatus for heating and bending glass sheets wherein a flat glass sheet to be bent is suspended within a liquid bath of a metallic alloy maintained at a temperature above the softening point of the glass, retained within the bath for sufficient time to heat the sheet to the desired bending temperature, and the sheet is then bent while retained within the bath by engaging opposite surfaces of the sheet with a pair of bent forming members which are submerged within the liquid bath. In its broader aspects, the invention also is applicable to the heating and tempering of flat glass.

With reference now to the drawings, and particularly to Fig. 1, there is shown a portion of a continuous line 10 used in heating and bending glass sheets by the method and apparatus of the invention herein disclosed. The equipment comprising the continuous line 10 includes a tank 11 having upstanding refractory side walls 12 and a bottom wall 13 for containing a bath 14 of heated liquid, a conveyor system generally designated by the numeral 15 supported above the tank 11, and an annealing lehr 16 having a portion thereof extending over the tank. Contained within the tank 11 and positioned beneath the surface $a$ of the liquid bath 14 is a pair of curved forming members 17 and 18 having solid shaping surfaces $b$ and $c$ formed therein, which may be composed of any of a variety of high temperature resisting materials, for example molybdenum. The member 17 is immovable and supported upon a side wall 12 of the tank. The other forming member 18 is mounted for horizontal movement toward and away from the fixed forming member 17 so that when a glass sheet is positioned therebetween, as will be later described in detail, the movable member 18 may engage one surface of said sheet and press the other surface of the sheet into conformity with the fixed member 17.

The movable forming member 18 is actuated by a hydraulic cylinder 19 or other suitable pressure exerting means secured to the tank side wall 12 adjacent the member 18 and having the rod portion 20 thereof extending through the side wall and secured to the movable forming member 18 intermediate the ends thereof. To provide for equalization of the force applied to the member 18, auxiliary cylinders 21 are positioned on either side of the main cylinder 19 and have their actuated rods 22 also extending inwardly into the tank and secured to the movable forming member 18 adjacent the ends thereof. Suitable seals 23 are provided around each of the rods of the various cylinders at their point of immergence into the tank interior to prevent the fluid contents thereof from leaking.

To supply heat to the liquid bath 14, a pair of electrode banks A and B are located in the tank bottom wall 13, the individual electrodes 24 of which extend upwardly from the tank bottom wall and into the molten bath 14. As best shown in Fig. 2, the electrodes in each bank are arranged in a triangular pattern adjacent each end of the tank and each bank is supplied by a separate source of three-phase alternating current (not shown) so that the molten contents of the tank are heated by the well-known joule effect. Although other arrangements of electrodes may be used, or other heating means, the pair of triangularly arranged electrode banks A and B shown in Fig. 2 is desirable and it is also preferable that each bank be supplied by an individual source of three-phase current. By locating the electrodes in this fashion and supplying each bank by an individual source of electricity, currents of electricity will not normally pass from one electrode bank to the other and thus contact the glass sheet or the forming members. As will be later described in detail, this unique positioning of the electrodes causes a flow of convection currents within the molten bath which are directed across the surfaces of a glass sheet to be heated when suspended within the bath.

It was previously mentioned that the tank 11 has refractory walls, and that electrodes are preferred as heating means. It should, of course, be understood that other materials may be used to form the tank, and other heating means may be used. For example, satisfactory heating of the liquid bath was carried out on a laboratory scale by using a stainless steel tank having the walls thereof flame heated.

The conveyor system 15 includes a rail 25 which defines a predetermined path over the surface a of the molten bath 14 and into and through the annealing lehr 16. The glass sheets 26 to be heated and bent may be supported by transfer bars 27 carried by dollies 28 which are movable along the rail 25. The transfer bars 27 are constructed in such a manner as to be flexible in a horizontal plane so as to adequately support the glass sheets 26 to be bent both prior to bending when they are flat, and after bending when they are of a curved shape. Suitable tongs 29 are secured to the transfer bars for clampedly engaging the upper edge of the glass sheets to be bent.

As shown in Fig. 1, the entry end C of the annealing lehr 16 is positioned over the tank 11 and has an opening 30 of limited width formed in the bottom wall 31 thereof and located over the pair of forming members 17 and 18. An entry opening 32 is provided in the lehr for initially receiving the glass sheets and is provided with a movable door 33 actuated by conventional lifting means (not shown).

Positioned above the entry end C of the annealing lehr 16 and extending upwardly therefrom is a sheet lowering means 34 which may, for example, comprise a hydraulic cylinder which is preferably longitudinally centered between the opposite ends of the forming members 17 and 18. The rod 35 of the cylinder extends downwardly through the roof 36 of the lehr and is equipped with a head 37 adapted to engage and clamp a vertically movable rail section 38 forming a part of the rail 25 and which is positioned above the forming members 17 and 18.

Although not described or shown, suitable means may be provided for actuating and controlling the various operating cylinders and the door moving means according to a predetermined sequence of timed steps.

In carrying out the method of the invention, the glass sheet 26 to be bent, which may be ground and polished, is suspended from the draw bar 27 by means of the tongs 29 attached thereto and conveyed along the rail 25 toward the lehr 16 by a suitable means of propulsion (not shown). Before the sheet reaches the lehr, the door 33 thereof is lifted and the sheet passes through the door opening 32 and is positioned over the lehr bottom wall opening 30 and directly above the curved forming members 17 and 18. As shown in Fig. 3, the flat sheet 26, at this time, is positioned in a vertical plane which is substantially parallel to and closely adjacent to the vertical plane defined by the shaping surface b of the stationary forming member 17 at its point of least curvature. After the sheet is so positioned, the door 33 is lowered to prevent cold drafts from entering the lehr, and a short time interval elapses before the lowering cylinder 34 is actuated and lowers the rail section portion 38 together with the glass sheet 26, which enters the bath edgewise in a vertical plane, until the sheet is completely submerged in the liquid bath 14 and suspended, as shown in phantom lines in Fig. 1, between the forming members 17 and 18. During the time interval in which the sheet is suspended within the entry end C of the lehr 16, the sheet is subjected to a certain amount of heat from the lehr itself and also to heat from the hot bath therebeneath and thus is subjected to a "preheating." This preheating of the sheet has the effect of lessening the thermal shock to the glass when contacted by the molten bath.

As previously stated, the bath 14 is maintained at a temperature above the bending or tempering temperature of the glass, for example above about 1100° F. The glass sheet is suspended in vertical position until the bath has heated the sheet to the desired bending temperature which varies somewhat depending upon the type of glass, but which is usually over about 900° F., for example in the order of 1060° F. After the sheet has reached this temperature, or slightly before, the cylinders 19 and 21 are actuated and advance the movable forming member 18 toward the stationary forming member 17 to press the glass sheet 26 into conformity with their solid shaping surfaces b and c. After being pressed to the desired curvature, the movable forming member 18 is withdrawn from contact with the glass sheet, the sheet is drawn upwardly in a vertical position by the cylinder 34 into its path of predetermined movement, and is then conveyed through the remaining portion of the lehr 16 wherein the temperature of the sheet is slowly reduced to approximately room temperature.

As a source of material for the heating bath 14, a molten alloy of aluminum and silicon which is non-wetting to the glass has been found to be satisfactory. For example, an aluminum-silicon alloy having 88% aluminum and 12% silicon which may be purchased from the Aluminum Company of America under their designation S–11. For bending sheets, the bath may be maintained at a temperature of approximately 1200° F. which is above the temperature at which the glass is normally heated prior to being engaged by the curved forming members 17 and 18, and to prevent oxidation by contact with air, a layer of charcoal 39 or other suitable substances is preferably spread over the bath surface.

In addition to rapidly heating the glass by contact therewith, a principal advantage of using a molten metallic bath is that at least a thin layer of the bath is maintained between the glass sheet and the forming members 17 and 18 when the sheet is bent into conformity with the pressing member. This thin film acts as a cushion which transmits the pressure applied by the members but at the same time prevents marring of the glass by the forming members which, of course, would cause objectionable optical defects in ground and polished glass.

It was previously mentioned that, as a result of the positioning of the triangular electrode banks A and B, currents of molten material would be caused to pass over the surface of the glass sheet when submerged in the bath. As shown in Fig. 1, when each of the electrode banks are supplied with electricity the portion of the liquid bath 14 between the electrodes 24 comprising each bank is resistance heated to a higher temperature than adjacent bath portions and rises upwardly toward the surface a of the bath. As a result, cold currents of bath material are drawn from its central portion of the bottom of the tank outwardly toward the electrode banks to be resistance heated and rise toward the surface. This produces two major thermal currents of molten material in the bath (indicated by the arrows in Fig. 1) which rise upwardly toward the bath surface a and then flow toward one another to the center of the tank or the area at which the glass sheet 26 is submerged therein. Since the sheet is cold when first lowered into the tank, the bath material immediately adjacent thereto is chilled and tends to sink toward the bottom of the tank. This tendency is increased since the electrode banks are drawing bath material from the bottom central portion of the tank outwardly. Thus, a glass sheet, when positioned in the bath, has the surfaces thereof engaged by moving thermal currents of bath material which pass upwardly from the electrode banks, turn toward the sheet, and then pass downwardly in contact therewith. As a result of these currents, a more rapid heating of the sheet is produced than would be the case if no thermal currents were established since the glass sheet would necessarily cool stagnant bath material adjacent thereto.

Although the use of an aluminum-silicon alloy with a composition of 88% aluminum and 12% silicon has been found satisfactory, other combinations of aluminum and silicon could be used. Also, other metallic alloys, or salts thereof, would undoubtedly prove satisfactory. The preferred requirements of the material used for the bath is that it be liquid or flowable at a temperature above the bending or tempering temperature of the glass sheet to be heated, that the material be non-wetting with respect to the sheet so that particles of the bath will not adhere to the sheet after it is removed therefrom, and that the material not have a boiling point below the bending or tempering temperature of the glass.

The modification of the apparatus of the invention shown in fragmentary sectional view in Fig. 4 is designed to temper glass sheets according to the method of the invention. In the modified form of the invention, the lehr 16 is not used and a pair of movable blast heads 40 and 41 are mounted above the tank 11 and adjacent the path of travel of the glass sheets 26 along the rail 25.

In tempering glass sheets in accordance with the method of the invention, a sheet 26 is positioned above the bath 14 in the tank 11. Since there is no heated enclosure around the sheet when so positioned, it is desirable to maintain the sheet for a short time in position above the tank to obtain the desired amount of preheating by the heat rising upwardly from the bath. The sheet is then lowered into the bath 14 and suspended therein for the time necessary to heat the same to the desired tempering temperature which is usually above about 1000° F. The sheet is then removed from the bath and immediately subjected to blasts of cooling air from the blast heads 40 and 41 to effect a rapid chilling of the glass sheet and thus temper the same.

If it is desired to bend a glass sheet prior to tempering, forming members 17 and 18 may be provided in the tank and utilized to bend the sheet while submerged in the bath.

It is to be understood that the form of the invention herewith shown and described is to be taken as a preferred embodiment of the same, and various changes may be resorted to without departing from the spirit of the invention or the scope of the subjoined claims.

I claim:

1. A method of heating and bending glass sheets, comprising supporting a glass sheet to be bent in a molten flowable bath maintained at a temperature above the bending temperature of the glass to heat said sheet to bending temperature, and while maintaining the sheet in contact with the bath applying pressure to the surface of the sheet to bend said sheet to a predetermined curvature.

2. A method of heating and bending glass sheets, comprising positioning a glass sheet to be bent in a molten bath maintained at a temperature above the bending temperature of the glass to heat said sheet to bending temperature, and while the sheet is within the bath bending said sheet into contact with a curved forming member.

3. A method of heating and bending glass sheets, as defined in claim 2, wherein currents of bath material are flowed past the sheet.

4. A method of heating glass sheets to bending temperature, comprising moving a glass sheet to be heated into a bath of molten flowable material heated to a temperature above bending temperature, completely submerging and retaining the sheet within the bath for a time interval sufficient to heat the sheet to bending temperature, bending the sheet into contact with a curved forming member while submerged within the bath, and then withdrawing the sheet from the bath and cooling said sheet.

5. A method of heating glass sheets as defined in claim 4, wherein the sheet is maintained in a substantially vertical position while being bent.

6. A method of heating and bending a glass sheet comprising passing the sheet edgewise into a bath of molten flowable material maintained at a temperature above the bending temperature of the glass, moving currents of bath material past the sheet while said sheet is being heated to bending temperature by the bath, bending the sheet into conformity with a curved forming member while retaining the sheet in the bath, and then removing the bent sheet from the bath and cooling said sheet.

7. In a method of bending a hot glass sheet, the step of bending the sheet into contact with a curved forming member while maintaining a layer of hot molten cushioning material between the sheet and said forming member.

8. In a method of bending a glass sheet as defined in claim 7, wherein the layer of cushioning material is at a temperature above the temperature of the glass sheet.

9. In a method of bending a glass sheet as defined in claim 7, wherein the cushioning material is an alloy of aluminum and silica.

10. In a method of bending a glass sheet as defined in claim 7, wherein the layer of cushioning material is a material that is non-wetting to the glass.

11. In apparatus for heating glass sheets, a tank adapted to contain a bath of flowable molten heating material, means for heating said bath to elevated temperature, and sheet bending means positioned in said bath.

12. In apparatus for heating glass sheets as defined in claim 11, wherein the sheet bending means comprises a pair of forming members, and means for moving one of said forming members toward the other.

13. In apparatus for heating glass sheets as defined in claim 12, wherein means is provided for positioning a glass sheet to be bent between said forming members.

References Cited in the file of this patent

UNITED STATES PATENTS

| | | |
|---|---|---|
| 170,339 | Brookfield | Nov. 23, 1875 |
| 1,959,215 | Owen | May 15, 1934 |
| 2,052,254 | Shaver | Aug. 25, 1936 |
| 2,145,128 | Phillips | Jan. 24, 1939 |
| 2,146,224 | Phillips | Feb. 7, 1939 |
| 2,194,730 | Wilson | Mar. 26, 1940 |
| 2,215,041 | Hostetter | Sept. 17, 1940 |
| 2,270,470 | Paddock | Jan. 20, 1942 |
| 2,292,684 | Blau | Aug. 11, 1942 |
| 2,395,727 | Devol | Feb. 26, 1946 |
| 2,442,242 | Lewis | May 25, 1948 |

FOREIGN PATENTS

| | | |
|---|---|---|
| 548,159 | Germany | Apr. 13, 1932 |
| 505,627 | Great Britain | May 11, 1939 |